United States Patent
Paulus et al.

(10) Patent No.: US 11,571,738 B2
(45) Date of Patent: Feb. 7, 2023

(54) WATER SOLUBLE POLYMER FOR CORE FORMING

(71) Applicant: Raytheon Technologies Corporation, Farmington, CT (US)

(72) Inventors: John R. Paulus, Afton, VA (US); Roy Eakins, Gold Canyon, AZ (US); Richard A. Hawkins, Waynesboro, VA (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 15 days.

(21) Appl. No.: 17/217,490

(22) Filed: Mar. 30, 2021

(65) Prior Publication Data

US 2022/0314306 A1    Oct. 6, 2022

(51) Int. Cl.
| | |
|---|---|
| *B22C 9/10* | (2006.01) |
| *B22C 1/14* | (2006.01) |
| *B22C 7/02* | (2006.01) |
| *C08L 29/04* | (2006.01) |

(52) U.S. Cl.
CPC .................. *B22C 9/10* (2013.01); *B22C 1/14* (2013.01); *B22C 7/02* (2013.01); *C08L 29/04* (2013.01)

(58) Field of Classification Search
CPC ................. B22C 1/14; B22C 7/02; B22C 9/10
USPC ..................... 164/137, 23, 24, 516
See application file for complete search history.

(56) References Cited

U.S. PATENT DOCUMENTS

| | | |
|---|---|---|
| 3,762,987 A | 10/1973 | Maruta et al. |
| 2016/0023375 A1 | 1/2016 | Uram |
| 2020/0062877 A1 | 2/2020 | Knopf et al. |

FOREIGN PATENT DOCUMENTS

| | | | | |
|---|---|---|---|---|
| CN | 102827445 A | * | 12/2012 | ............. B29C 43/58 |
| CN | 104493081 A | * | 4/2015 | ............... B22C 7/02 |
| WO | 2020018815 A1 | | 1/2020 | |

OTHER PUBLICATIONS

Machine translation for CN 102827445 A (Year: 2012).*
Machine translation for CN 104493081 A (Year: 2015).*
Search Report issued in European Patent Application No. 22160763.3; Application Filing Date Mar. 8, 2022; dated Aug. 22, 2022 (9 pages).

* cited by examiner

*Primary Examiner* — Kevin P Kerns
(74) *Attorney, Agent, or Firm* — Cantor Colburn LLP

(57) ABSTRACT

A core forming method is provided for forming a core. The core forming method includes forming one or more mold parts of water-soluble polymer (WSP), each mold part including a bond area and a part forming area, moistening the bond areas, bonding the mold parts together with the bond areas moistened and the part forming areas aligned to form a cavity shaped as a negative of the core, injecting a slurry, which is non-reactive with the WSP, into the cavity and removing the WSP with water once the slurry is cured.

20 Claims, 4 Drawing Sheets

WATER SOLUBLE POLYMER FOR CORE FORMING

BACKGROUND

The present disclosure relates to the formation of complex articles by injection into a fugitive mold system including a water-soluble polymer (WSP). Of particular note is the formation of ceramic cores for investment casting by the use of this process.

Investment casting is commonly used in the aerospace and power industries to produce gas turbine components such as airfoils having complex outer surface shapes and internal cooling passage geometries. The production of a component using investment casting processes involves producing a ceramic casting vessel including an outer ceramic shell having an inside surface corresponding to the desired outer surface shape of the component, and one or more ceramic cores positioned within the outer ceramic shell corresponding to hollow interior passages to be formed within the component. Molten metal alloy is introduced into the ceramic casting vessel and is then allowed to cool and to solidify. The outer ceramic shell and ceramic core(s) are then removed by mechanical or chemical means to reveal the cast component having the desired external shape and hollow interior volume(s) in the shape of the ceramic core(s).

Such investment casting processes are useful for producing components having a limited number of interior passages of relatively simple shape, such as a turbine blade design which includes relatively straight radially extending cooling passages. However, much more complex three dimensional cooling schemes incorporating convoluted 3-D cooling passages will be needed in the near future for advanced gas turbine blades, and the production and use of ceramic cores reflecting such convoluted cooling passages will surpass existing investment casting process capabilities.

Accordingly, an improved method of casting components with interior passageways is needed.

BRIEF DESCRIPTION

According to an aspect of the disclosure, a method is provided for forming a core for use in investment casting. The core forming method includes forming one or more mold parts of water-soluble polymer (WSP), each mold part including a bond area and a part forming area, moistening the bond areas, bonding the mold parts together with the bond areas moistened and the part forming areas aligned to form a cavity shaped as a negative of the core, injecting a slurry, which is non-reactive with the WSP, into the cavity and removing the WSP with water once the slurry is cured.

In accordance with additional or alternative embodiments, the WSP includes one or more polyvinyl alcohols dissolvable at a water temperature between about 20° C. to about 100° C.

In accordance with additional or alternative embodiments, the forming of the mold parts includes providing master tools from which the mold parts are formable.

In accordance with additional or alternative embodiments, the moistening of the bond areas includes exposing the bond areas to hot or cold water vapor.

In accordance with additional or alternative embodiments, the bonding of the mold parts together includes one or more of self-aligning the mold parts and placing the mold parts in an injection frame.

In accordance with additional or alternative embodiments, the bonding of the mold parts together includes drying the mold parts prior to the injecting of the slurry.

In accordance with additional or alternative embodiments, the slurry includes a non-aqueous slurry.

In accordance with additional or alternative embodiments, the removing of the WSP includes spraying the WSP with water.

According to an aspect of the disclosure, a method is provided for forming a core for use in investment casting. The core forming method includes forming first and second mold parts of water-soluble polymer (WSP), each of the first and second mold parts including a bond area and a part forming area, moistening the bond areas, bonding the first and second mold parts together with the bond areas moistened and the part forming areas aligned to form a cavity shaped as a negative of the core, injecting a non-aqueous slurry, which is non-reactive with the WSP, into the cavity and removing the WSP with water once the non-aqueous slurry is cured.

In accordance with additional or alternative embodiments, the WSP includes one or more polyvinyl alcohols dissolvable at a water temperature between about 20° C. to about 100° C.

In accordance with additional or alternative embodiments, the forming of the first and second mold parts includes providing first and second master tools and forming the first and second mold parts from the first and second master tools, respectively.

In accordance with additional or alternative embodiments, the moistening of the bond areas includes exposing the bond areas to hot or cold water vapor.

In accordance with additional or alternative embodiments, the bonding of the first and second mold parts together includes one or more of self-aligning the first and second mold parts and placing the first and second mold parts in an injection frame.

In accordance with additional or alternative embodiments, the bonding of the first and second mold parts together includes drying the first and second mold parts prior to the injecting of the slurry.

In accordance with additional or alternative embodiments, the removing of the WSP includes spraying the WSP with water.

According to an aspect of the disclosure, a method is provided for forming a core for use in investment casting. The core forming method includes forming mold parts of water-soluble polymer (WSP), each mold part including a bond area and a part forming area, moistening the bond areas, bonding the mold parts together with the bond areas moistened and the part forming areas aligned to form a cavity shaped as a negative of the core, injecting a coating into the cavity to coat the part forming areas, injecting a slurry, which is isolated from the WSP by the coating, into the cavity, and removing the WSP with water once the slurry is cured.

In accordance with additional or alternative embodiments, the WSP includes one or more polyvinyl alcohols dissolvable at a water temperature between about 20° C. to about 100° C.

In accordance with additional or alternative embodiments, the forming of the mold parts includes providing master tools from which the mold parts are formable.

In accordance with additional or alternative embodiments, the moistening of the bond areas includes exposing the bond areas to hot or cold water vapor.

In accordance with additional or alternative embodiments, the bonding of the mold parts together includes one or more of self-aligning the mold parts and placing the mold parts in an injection frame.

In accordance with additional or alternative embodiments, the bonding of the mold parts together includes drying the mold parts prior to the injecting of the coating and the injecting of the slurry.

In accordance with additional or alternative embodiments, the slurry includes aqueous slurry.

In accordance with additional or alternative embodiments, the core forming method further includes removing the coating.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Current processes for forming complex ceramic cores for investment casting can involve the use of certain types of inserts that are provided within a ceramic core mold. These inserts can be made of various types of materials including, but not limited to, rubbers, wax and the like. It has been found, however, that the inserts present problems. For example, that rubber inserts are flexible, exhibit dimensional inaccuracy and fail to bond with wax. In addition, because of the fragility of the rubber or wax inserts, core forming processes must be gentle and executed at relatively low pressures and temperatures.

Thus, as will be described below, core forming processes are provided in which water-soluble polymers (WSPs) are used to form ceramic cores. The WSP is compatible with the slurry mixture and the resultant core is sufficiently rigid to enable injection molding of the ceramic cores at relatively high-pressure for more reliable filling of the core mold. In addition, mold parts formed of WSPs are relatively easily bondable together upon exposure to a small amount of water. As a result, if alignment between the mold parts can be achieved to a high tolerance, the resulting ceramic core will be relatively free of flash.

Figure 1:
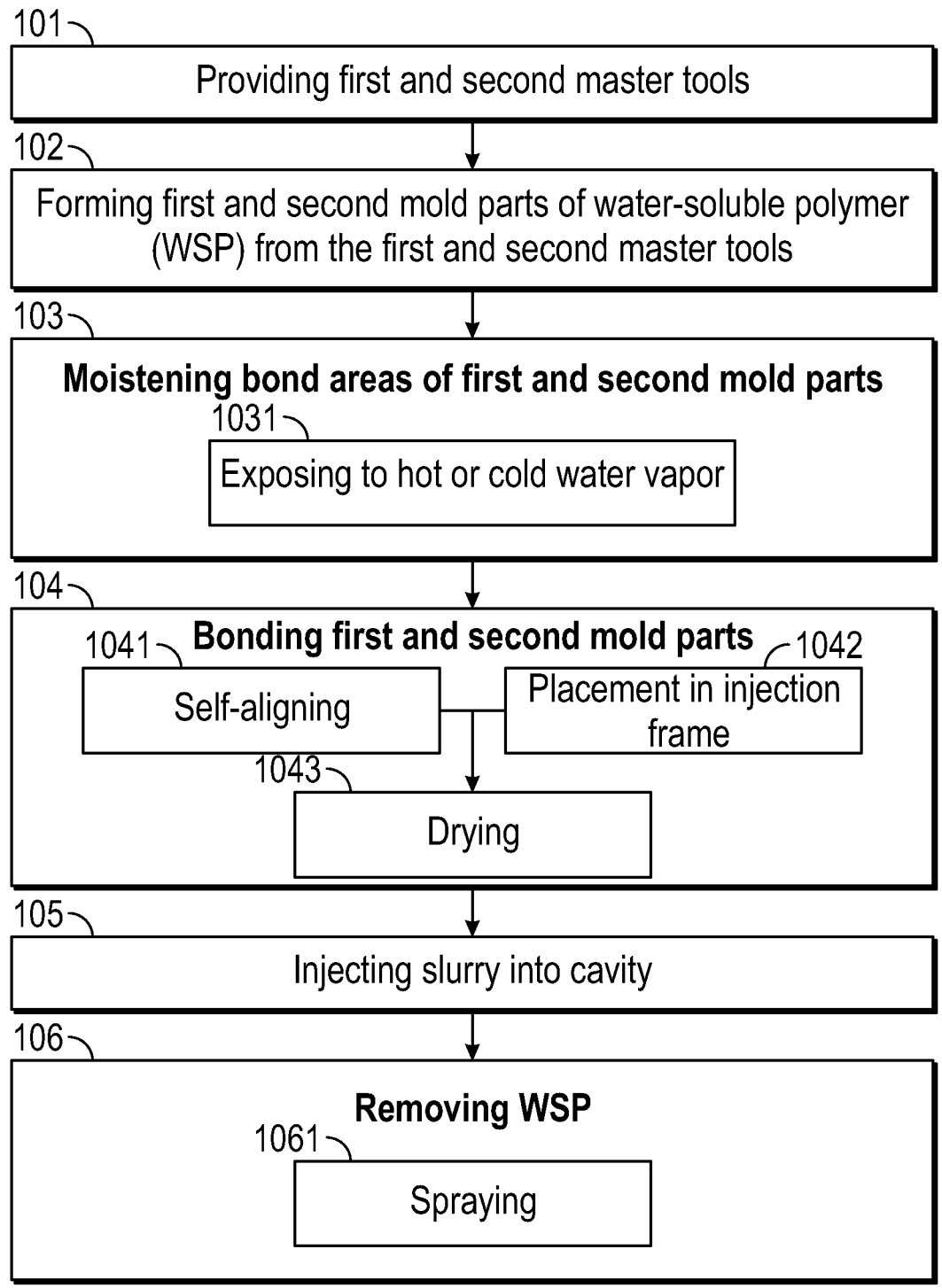
FIG. 1 is a flow diagram illustrating a core forming method for forming a core in accordance with embodiments.

With reference to FIG. 1, a core forming method for forming a core is provided in accordance with embodiments. The core forming method includes providing first and second master tools 101 and forming first and second mold parts of water-soluble polymer (WSP) from the first and second master tools 102. The forming of the first and second mold parts of operation 102 is executed by injection into the master tools and is executed such that each of the first and second mold parts include a bond area and a part forming area. The core forming method further includes moistening the bond areas 103 of each of the first and second mold parts and, seconds later while the bond areas 103 remain moistened, bonding the first and second mold parts together 104. The bonding of the first and second mold parts together of operation 104 is executed such that, with the bond areas moistened and with the part forming areas aligned, the part forming areas form a cavity that is shaped as a negative of the core. In addition, the core forming method includes injecting a slurry, such as non-aqueous slurry, which is non-reactive with the WSP, into the cavity 105 and removing the WSP with water once the non-aqueous slurry is cured 106 from the cured slurry.

Although the description provided above refers to first and second mold parts, it is to be understood that this is not required and that other embodiments exist in which, for example, additional mold parts are formed. In these or other cases, the first and second mold parts and the additional mold parts can be bonded or ganged together at various stages of the core forming method.

In accordance with embodiments, the WSP is preferably one or more polyvinyl alcohols capable of being dissolved at a water temperature between about 20° C. to about 100° C., preferably at about 22° C. to 50° C. A preferred WSP is Aquasys120™ available from Infinite Material Solutions, LLC, or another similar product.

The moistening of the bond areas of operation 103 can include exposing the bond areas 1031 to hot or cold water vapor or other similar methods provided the bonding of operation 104 can be executed within seconds of the bond areas becoming moistened.

The bonding of the first and second mold parts together of operation 104 can include one or more of self-aligning the first and second mold parts 1041 by, for example, forming alignment members, for example only cones and holes, in the first and second mold parts that serve to position the first and second mold parts in an alignment condition, and placing the first and second mold parts in an injection frame 1042 which is configured to reliably position the first and second mold parts in an alignment condition. The bonding of the first and second mold parts together of operation 104 can further include drying the first and second mold parts prior to the injection of the slurry 1043. In addition, applying pressure such that the bonding surfaces of the first and second mold parts press together is an element of the bonding process. To this end, the injection frame or another apparatus that holds the first and second mold parts needs to be specifically designed to apply pressure to the bonding surfaces.

It is important to note that the bonding of the first and second mold parts together of operation 104 does not require the application of adhesive or any other bonding agent which might add a variable thickness between bonded parts, result in a leakage of the adhesive or bonding agent or otherwise alter the overall geometry of the components.

The slurry or the non-aqueous slurry can include epoxy and one or more of ceramic and metallic particles, powdered metallic particles, carbides and various other composite components mixed therein. The slurry or the non-aqueous slurry can also include compatible polymers, such as epoxies or urethanes with no powder or solids component at all.

The removing of the WSP once the non-aqueous slurry is cured of operation 106 can include spraying the WSP with water or another solvent 1061 of the WSP for a sufficient period of time to remove all of the WSP from the cured slurry. In some cases, some of the WSP can remain and be burned out when the cured slurry is fired in a kiln.

Figure 2:
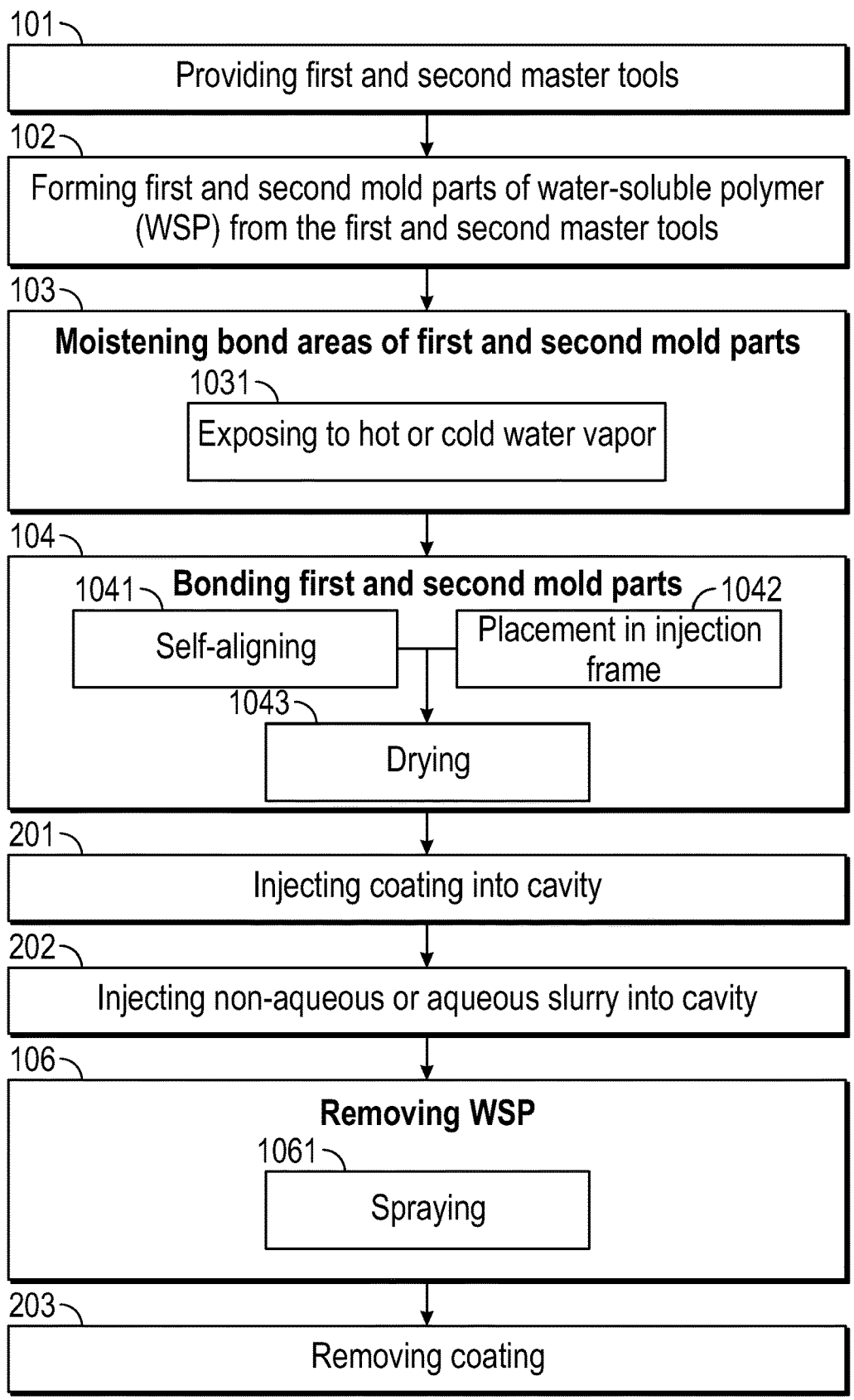
FIG. 2 is a flow diagram illustrating a core forming method for forming a core in accordance with alternative embodiments.

With reference to FIG. 2, a core forming method for forming a core is provided in accordance with alternative embodiments. The core forming method of FIG. 2 is similar to that of FIG. 1 and like elements will not be redescribed for clarity and brevity. The major difference between the core forming method of FIG. 2 and that of FIG. 1 is that the core forming method of FIG. 2 includes injecting a coating into the cavity to coat the part forming areas 201 prior to injecting the slurry and subsequently injecting the slurry, which is then isolated from the WSP by the coating, into the cavity 202. In this case, because the slurry is isolated from the WSP by the coating, the slurry can include non-aqueous or aqueous slurry. In this latter case, the aqueous slurry is effectively prevented from dissolving the first and second mold parts formed of the WSP by the coating. Also, an additional difference between the core forming method of FIG. 2 and that of FIG. 1 is that the core forming method of FIG. 2 can further include a step of removing the coating 203 or permitting the coating to remain in place.

With reference to FIGS. 3A-3F, the core forming methods of FIGS. 1 and 2 will be illustrated in further detail.

It is to be understood that, while the illustrations of FIGS. 3A-3F show mirrored components, this is not required and that other configurations are possible. Indeed, since the core forming methods described herein are intended to form complex ceramic cores, in particular, the components shown in FIGS. 3A-3F are not going to be mirrors of one another in actuality and are presented as such only for clarity and brevity.

Figure 3A:
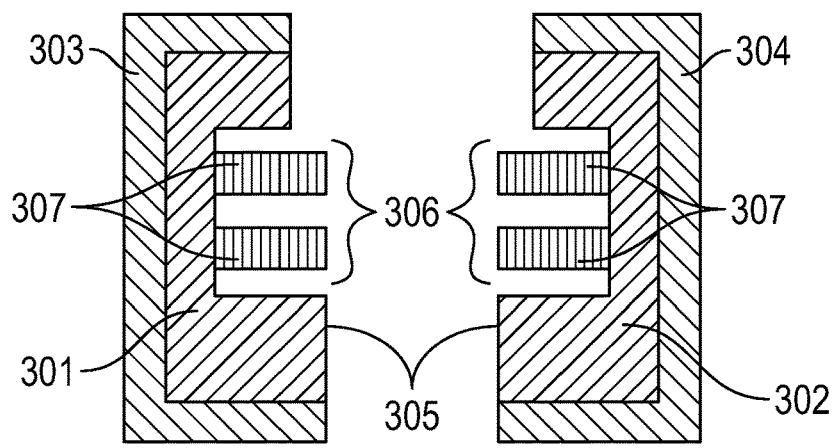
FIG. 3A is a side schematic view illustrating the formation of first and second mold parts for core forming from first and second master tools in accordance with embodiments.

As shown in FIG. 3A, first and second mold parts 301 and 302 are formed of WSP from first and second master tools 303 and 304, respectively. The first and second master tools 303 and 304 each have two components (not shown in FIG. 3A). In particular, each of the first and second master tools 303 and 304 has two sides, one that forms the part shape and one that forms the side that mates to the injection frame. The first and second mold parts 301 each include a bond area 305 and a part forming area 306. The bond area 305 can generally surround the part forming area 306 of each of the first and second mold parts 301 and 302, except to the extent that the part forming areas 306 can be configured to define ribs 307 that will contribute to the formation of distinct holes in the ceramic core being investment casted. In these cases, the bond areas 305 can also be provided at the edges of the ribs 307.

Figure 3B:
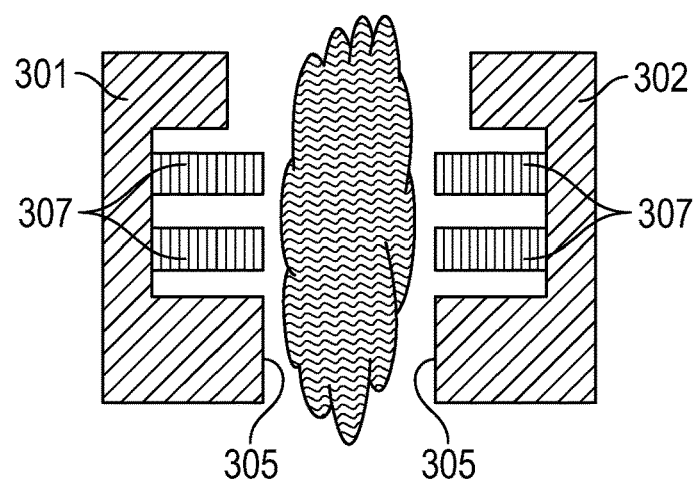
FIG. 3B is a side schematic view illustrating the moistening of the first and second mold parts in accordance with embodiments.

As shown in FIG. 3B, the bond areas 305 of each of the first and second mold parts 301 and 302 are moistened by, for example, exposing the bond areas 305 to hot or cold water vapor. As a result, the bond areas 305 of each of the first and second mold parts 301 and 302, which surround the part forming areas 306 (see FIG. 3A) and which are provided at the edges of the ribs 307, are easily bondable to one another in a manner that does not lead to flash formation in particular.

Figure 3C:
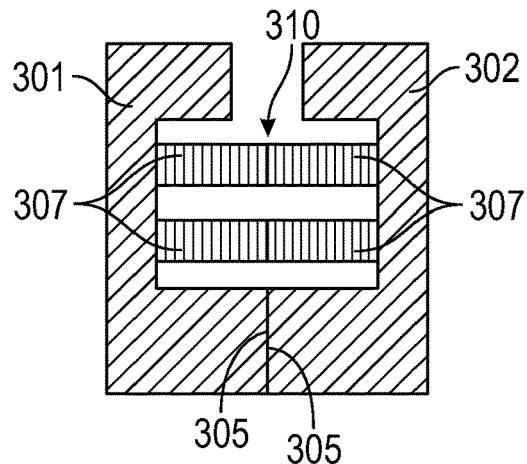
FIG. 3C is a side schematic view illustrating the bonding of the first and second mold parts and the formation of a cavity in accordance with embodiments.

As shown in FIG. 3C, within seconds of the bond areas 305 of the first and second mold parts 301 and 302 being moistened, the first and second mold parts 301 and 302 are aligned with each other and brought together such that the bond areas 305 are bonded. As noted above, the first and second mold parts 301 and 302 are aligned by self-alignment or by disposition in an injection frame. In any case, the part forming areas 306 (see FIG. 3A) cooperatively form a cavity 310. This cavity 310 is shaped as a negative of the shape of the ceramic core being investment casted. Notably, as a result of the presence of the ribs 307 for each of the first and second mold parts 301 and 302, the cavity 310 can have a relatively complex geometry that corresponds negatively to the relatively complex geometry of the ceramic core being investment casted.

Figure 3D:
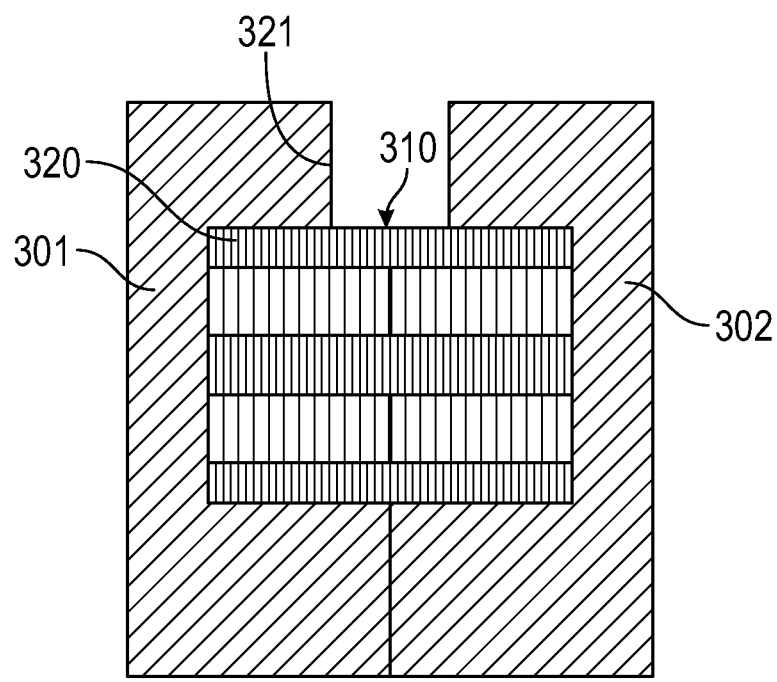
FIG. 3D is a side schematic view illustrating the injection of a slurry into the cavity in accordance with embodiments.

As shown in FIG. 3D, slurry 320, such as non-aqueous slurry, which is non-reactive with the WSP of the first and second mold parts 301 and 302 is injected into the cavity 310 through injection opening 321. The slurry 320 can include epoxy and one or more of ceramic and metallic particles mixed therein. In the case of the core forming method of FIG. 2, the injection of the slurry 320 can be preceded by an injection of the coating to coat the interior surfaces of the part forming areas 306 (see FIG. 3A) of each of the first and second mold parts 301 and 302. Here, because the coating isolates the slurry 320 from the WSP of the first and second mold parts 301 and 302, the slurry 320 can be a non-aqueous slurry or an aqueous slurry.

Figure 3E:
FIG. 3E is a side schematic view illustrating the removal of WSP from a core cured from the slurry in accordance with embodiments.
Figure 3E:
Figure 3E:

As shown in FIG. 3E, once the slurry 320 is cured, it forms the ceramic core 330. At this point, the WSP of the first and second mold parts 301 and 302 is removed to reveal the ceramic core 330.

Technical effects and benefits of the present disclosure are the provision of a core forming method that involves the use of WSP to form a core. The WSP is more rigid than other fugitive materials commonly used in core forming and is compatible with the slurry. In addition, since WSP is bondable to WSP when moistened, the core forming method can be executed without the formation of flash.

In addition, advantages of WSP over current systems lies in the rigidity of WSP versus flexible silicone rubber and wax that may be used to form complex parts. For example, most core production involves the formation of a complex core by injection of individual sub-component parts in hard tools and then a bonding of those parts together if necessary, to form the desired complex shape. In other cases, a ceramic slurry is cast around a wax fugitive which is melted out to create a "monolithic multiwall" part. In contrast to those methods, the use of WSP described herein outperforms wax and other similar system in several important ways: WSP is more rigid, allowing higher injection pressures and temperatures; WSP can hold tighter dimensional repeatability; and WSP can be bonded to itself to eliminate flash using no additional bonding agent.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method for forming a core for use in investment casting, comprising:
    forming first and second mold parts of water-soluble polymer (WSP), each mold part comprising a bond area and a part forming area;
    moistening the bond areas;
    bonding the first and second mold parts together with the bond areas moistened and the part forming areas aligned to form a cavity shaped as a negative of the core;
    injecting a slurry, which is non-reactive with the WSP, into the cavity; and
    removing the WSP with water once the slurry is cured.

2. The method according to claim 1, wherein the WSP comprises one or more polyvinyl alcohols dissolvable at a water temperature between about 20° C. to about 100° C.

3. The method according to claim 1, wherein the bonding of the mold parts together with the bond areas moistened is executed within seconds of the moistening of the bond areas by exposing the bond areas to water vapor.

4. The method according to claim 1, wherein the bonding of the mold parts together comprises one or more of self-aligning the mold parts and placing the mold parts in an injection frame.

5. The method according to claim 1, wherein the bonding of the mold parts together comprises drying the mold parts prior to the injecting of the slurry.

6. The method according to claim 1, wherein the slurry comprises a non-aqueous slurry.

7. The method according to claim 1, wherein the removing of the WSP comprises spraying the WSP with water.

8. A method for forming a core for use in investment casting, comprising:
    forming first and second mold parts of water-soluble polymer (WSP), each of the first and second mold parts comprising a bond area and a part forming area;
    moistening the bond areas;
    bonding the first and second mold parts together with the bond areas moistened and the part forming areas aligned to form a cavity shaped as a negative of the core;
    injecting a non-aqueous slurry, which is non-reactive with the WSP, into the cavity; and
    removing the WSP with water once the non-aqueous slurry is cured.

9. The method according to claim 8, wherein the WSP comprises one or more polyvinyl alcohols dissolvable at a water temperature between about 20° C. to about 100° C.

10. The method according to claim 8, wherein the bonding of the mold parts together with the bond areas moistened is executed within seconds of the moistening of the bond areas by exposing the bond areas to water vapor.

11. The method according to claim 8, wherein the bonding of the first and second mold parts together comprises one or more of self-aligning the first and second mold parts and placing the first and second mold parts in an injection frame.

12. The method according to claim 8, wherein the bonding of the first and second mold parts together comprises drying the first and second mold parts prior to the injecting of the slurry.

13. The method according to claim 8, wherein the removing of the WSP comprises spraying the WSP with water.

14. A method for forming a core for use in investment casting, comprising:
    forming first and second mold parts of water-soluble polymer (WSP), each mold part comprising a bond area and a part forming area;
    moistening the bond areas;
    bonding the first and second mold parts together with the bond areas moistened and the part forming areas aligned to form a cavity shaped as a negative of the core;
    injecting a coating into the cavity to coat the part forming areas;
    injecting a slurry, which is isolated from the WSP by the coating, into the cavity; and
    removing the WSP with water once the slurry is cured.

15. The method according to claim 14, wherein the WSP comprises one or more polyvinyl alcohols dissolvable at a water temperature between about 20° C. to about 100° C.

16. The method according to claim 14, wherein the bonding of the mold parts together with the bond areas moistened is executed within seconds of the moistening of the bond areas by exposing the bond areas to water vapor.

17. The method according to claim 14, wherein the bonding of the mold parts together comprises one or more of self-aligning the mold parts and placing the mold parts in an injection frame.

18. The method according to claim 14, wherein the bonding of the mold parts together comprises drying the mold parts prior to the injecting of the coating and the injecting of the slurry.

19. The method according to claim 14, wherein the slurry comprises aqueous slurry.

20. The method according to claim 14, further comprising removing the coating.

* * * * *